United States Patent [19]

Kashiwazaki et al.

[11] Patent Number: 4,689,949
[45] Date of Patent: Sep. 1, 1987

[54] COAL GASIFICATION COMPOSITE POWER GENERATOR

[75] Inventors: Masamichi Kashiwazaki; Kiichiro Ogawa; Satoshi Uchida, all of Tokyo, Japan

[73] Assignee: Mitsubishi Jukogyo Kabushiki Kaisha, Tokyo, Japan

[21] Appl. No.: 816,389

[22] Filed: Jan. 6, 1986

[30] Foreign Application Priority Data

Jan. 30, 1985 [JP] Japan .................................. 60-14340

[51] Int. Cl.$^4$ ............................ C10J 3/48; C10J 3/50; C10J 3/86; F02B 43/08
[52] U.S. Cl. ...................................... 60/39.12; 48/77; 48/86 R
[58] Field of Search ........................ 60/39.12, 39.182; 48/77, 63, 64, 76, 86 R; 110/347, 229; 122/7 R, 6 A

[56] References Cited

U.S. PATENT DOCUMENTS

| | | | |
|---|---|---|---|
| 3,818,869 | 6/1974 | Blaskowski | 110/229 |
| 4,238,923 | 12/1980 | Waryasz | 60/39.182 |
| 4,255,926 | 3/1981 | Heyn et al. | 60/39.182 |
| 4,325,311 | 4/1982 | Beranek et al. | 110/347 |
| 4,410,336 | 10/1983 | Blaskowski | 60/39.182 |
| 4,425,757 | 1/1984 | Heyn et al. | 122/7 R |

Primary Examiner—Peter Kratz
Attorney, Agent, or Firm—Toren, McGeady & Associates

[57] ABSTRACT

A coal gasification composite power generator which comprises a coal pulverizer in which coal is finely pulverized, a means for transferring the finely pulverized coal while drying the finely pulverized coal with a drying gas, a coal feeding means for feeding the coal from the transfer means to a gasification furnace in which the coal is converted to a combustible gas, a gas turbine connected to the gasification furnace and driven with the combustible gas fed from the gasification furnace, and an exhaust gas boiler to which an exhaust gas from the gas turbine is passed to recover the heat of the exhaust gas. The power generator is characterized by further comprising a device for withdrawing part of the combustion exhaust gas at an upstream and a downstream side of the exhaust gas boiler and mixing the withdrawn gases and a pipe connecting the withdrawing device and the pulverizer, so that the mixed gas is passed to the pulverizer.

4 Claims, 3 Drawing Figures

F I G. 1
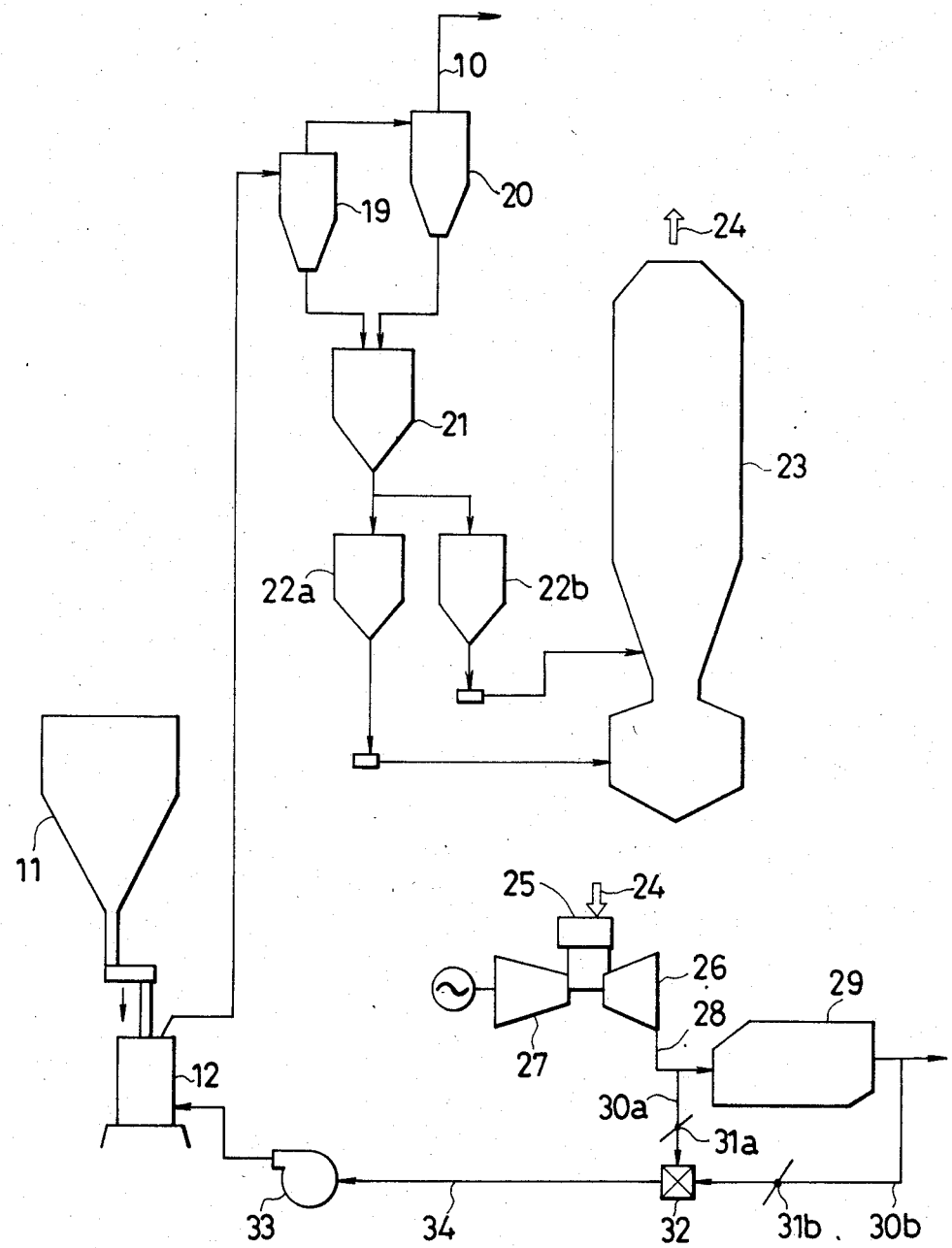

COAL GASIFICATION COMPOSITE POWER GENERATOR

BACKGROUND OF THE INVENTION

1. Field of the Invention

This invention relates to an improved composite power generator and more particularly, to a feed technique of coal to a gasification furnace in a coal gasification composite power generator of a pressurized entrained bed type.

2. Description of the Prior Art

Typical coal feed systems adapted for use in known coal gasification furnaces are shown in FIGS. 2 and 3. The system shown in FIG. 2 is an aqueous slurry system in which coal from a coal bunker 1 is milled in a wet mill 2 and is then fed to a gasification furnace 4 by means of a pump 3. Water 5 and a surface active agent 6 are fed to the mill 2.

The system shown in FIG. 3 is a dried, finely powdered or pulverized coal feed system. In this system, coal fed from a coal bunker 11 is finely powdered in a pulverizer 12. The finely powdered coal is fed to a cyclone 19 as entrained with a drying gas 18 which is being fed from a fan 17 to the pulverizer 12. The drying gas 18 is produced in a hot air furnace 13 in which a fuel 14 is combusted with the aid of air 15 and is passed through a cooler 16 to the fan 17.

The coal collected in the cyclone 19 and a bag filter 20 is stored in a coal bottle 21, followed by passing through a pair of lock hoppers 22a, 22b to a gasification furnace 23. Reference numeral 10 denotes a vent pipe through which a gas containing steam is discharged in the air and which is connected to a smokestack. The combustible gas produced in the gasification furnace 23 is used as energy for power generation.

However, the above prior art systems have the following problems. With the aqueous system shown in FIG. 2, a large amount of moisture is brought into the gasification furnace, so that the heat energy in the gasification furnace is lost corresponding to latent heat for evaporation of water, thus leading to a lowering of the formation efficiency of the combustible gas.

On the other hand, the dried, finely powdered coal feed system shown in FIG. 3 undesirably needs a separate hot air furnace for providing a drying medium. This requires an additional fuel for the hot air furnace.

SUMMARY OF THE INVENTION

It is accordingly an object of the present invention to provide an improved coal gasification system for use in a composite power generator which overcomes the problems involved in the known counterparts.

It is another object of the invention to provide such a coal gasification system as mentioned above in which an additional hot air furnace and fuel thereof are not necessary and heat in the system can be effectively utilized with an improved gasification efficiency.

Briefly, the present invention is characterized in that the combustible gas produced in such a gasification furnace as described with reference to FIGS. 2 and 3 is used to drive a gas turbine for power generation and an exhaust from the gas turbine is utilized to feed finely powdered coal to the gasification furnace while drying the coal during the feed by entrainment.

More specifically, the present invention provides a coal gasification composite power generator which comprises a coal pulverizer in which coal is finely pulverized, a means for transferring the finely pulverized coal while drying the finely pulverized coal with a drying gas, a coal feeding means for feeding the coal from the transfer means to a gasification furnace in which the coal is converted to a combustible gas, a gas turbine connected to the gasification furnace and driven by combustion of the combustible gas fed from the gasification furnace, and an exhaust gas boiler to which an exhaust gas from the gas turbine is passed to recover the heat of the exhaust gas. The power generator is characterized by further comprising a means for withdrawing part of the combustion exhaust gas at an upstream and a downstream side of the exhaust gas boiler and mixing the withdrawn gases, and a pipe connecting the withdrawing means and the pulverizer, so that the mixed gas is passed to the pulverizer for use as the drying gas.

According to the invention, while part of the exhaust gas from the gas turbine is withdrawn as a heat source of drying the fine coal powder, part of an outlet gas of the exhaust gas boiler or an inlet gas of a smokestack is withdrawn for controlling the temperature of the former part. These gases are properly mixed to obtain a hot gas. This hot gas is used as the drying gas. Thus, any separate hot air furnace and a fuel therefor are unnecessary and the heat energy in the system can be effectively utilized, ensuring an improved efficiency of the gasification.

Other objects, advantages and features of the present invention will become apparent from the following description with reference to the accompanying drawings.

BRIEF DESCRIPTION OF THE DRAWINGS

FIG. 1 is a flowchart of a coal gasification composite power generator embodying the invention.

DETAILED DESCRIPTION OF THE INVENTION

Figure 2:
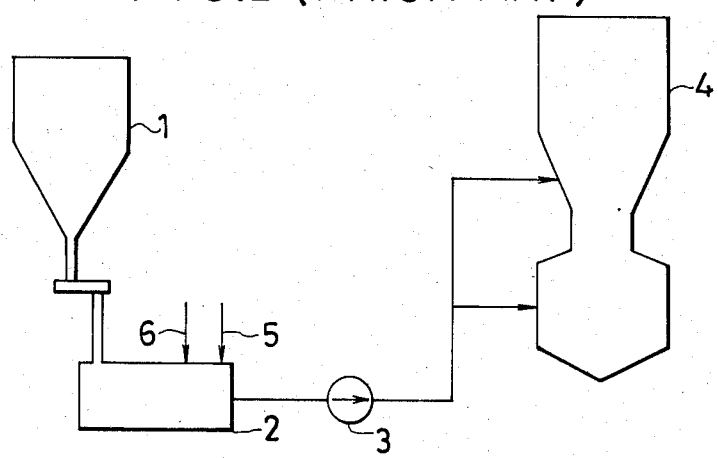
FIGS. 2 and 3 are, respectively, flowcharts of known coal feed systems.
Figure 3:
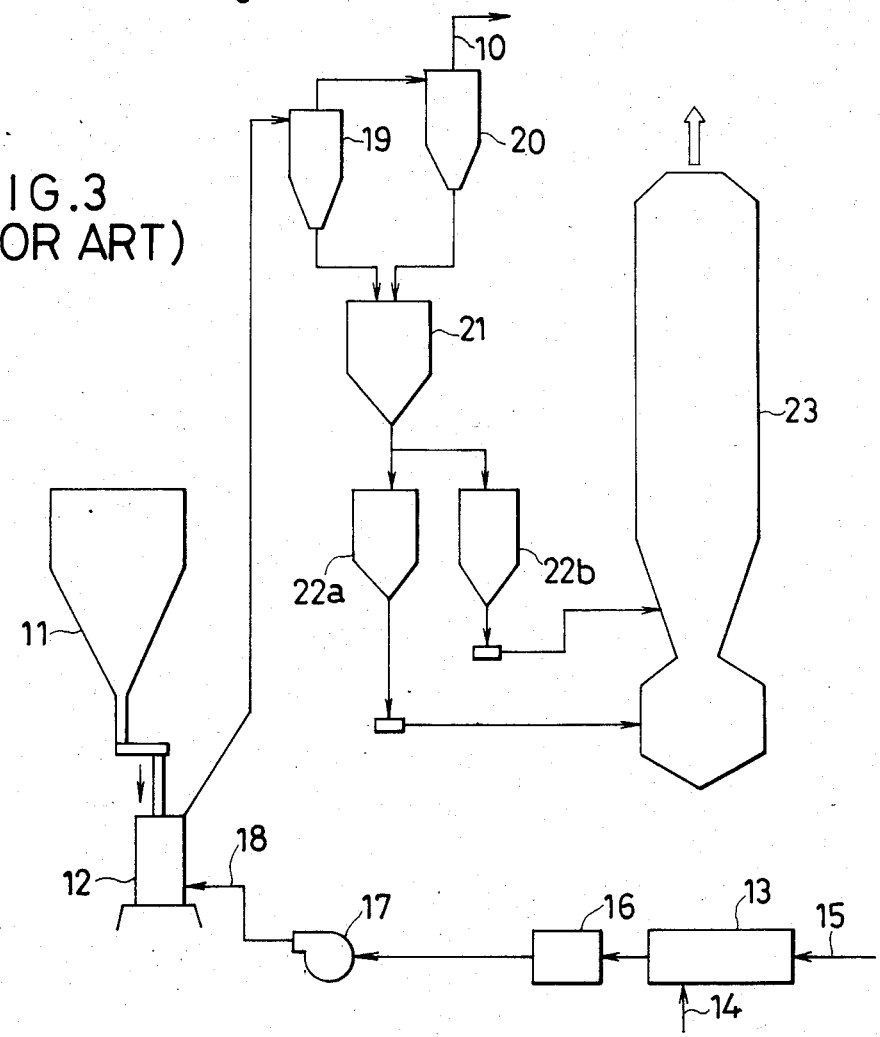

One embodiment of the present invention is described in detail with reference to FIG. 1, in which like reference numerals as shown in FIG. 3 indicate like parts and the parts described with reference to FIG. 3 are not described again.

In FIG. 1, a combustible gas 24 produced in the gasification furnace 23 is introduced into a combustor 25 in which it is combusted. The combustion gas is fed into a gas turbine 26 to drive the gas turbine 26. A compressor 27 is in turn driven by the gas turbine 26 to generate electric power. At the same time, a combustion exhaust gas from the gas turbine 26 is fed to an exhaust gas boiler 29 in which the heat of the exhaust gas is recovered and the gas is released to the air through a smokestack.

In this embodiment, pipes 30a and 30b are connected to the exhaust gas boiler 29 is located upstream and downstream of the boiler 29, respectively, in order to withdraw part of the combustion exhaust gas from the respective pipes. The combustion gases withdrawn through the pipes 30a, 30b are mixed in a mixer 32 through dampers 31a, 31b. The gas mixture is fed, as the drying gas, through a pipe 34 to the coal pulverizer 12 by means of a hot gas fan 33.

What is claimed is:

1. In a coal gasification composite power generator which comprises a coal pulverizer in which coal is finely pulverized, a means for transferring the finely pulverized coal with a drying gas, a coal feeding means for feeding the coal from the transfer means to a gasification furnace in which the coal is converted to a combustible gas, a gas turbine connected to the gasification furnace and driven by combustion of the combustible gas fed from the gasification furnace, and an exhaust gas boiler to which an exhaust gas from the gas turbine is passed to recover the heat of the exhaust gas, the improvement characterized by further comprising gas mixing means, means connecting said gas turbine to said exhaust gas boiler, first means for withdrawing part of the combustion exhaust gas from said gas turbine from said connecting means upstream from the exhaust gas boiler and introducing the withdrawn part of the combustion exhaust exhaust gas into said gas mixing means, outlet means for flowing combustion exhaust gases frm said exhaust gas boiler, second means for withdrawing combustion exhaust gases from said outlet means and introducing the withdrawn part into said gas mixing means, and a pipe connecting said gas mixing means to said pulverizer, so that the mixed gas is passed to the pulverizer for use as the drying gas.

2. A coal gasification composite power generator according to claim 1, wherein said coal feed means includes a cyclone, a bag filter, a coal bottle and a lock hopper.

3. A coal gasification composite power generator according to claim 1, wherein each of said first and second withdrawing means comprises a pipe and each of said pipes has a damper.

4. A coal gasification composite power generator according to claim 3, wherein said pipe connecting said gas mixing means to said pulverizer is a drying gas feed pipe having a hot gas fan therein.

* * * * *